(12) United States Patent
Fosmer et al.

(10) Patent No.: US 12,539,787 B2
(45) Date of Patent: Feb. 3, 2026

(54) LOW-VOLTAGE DISCHARGE OF HIGH-VOLTAGE BATTERY PACK

(71) Applicant: GM GLOBAL TECHNOLOGY OPERATIONS LLC, Detroit, MI (US)

(72) Inventors: Daniel B. Fosmer, Highland, MI (US); Craig T. Simmerman, Howell, MI (US); Jared Wozniak, Farmington Hills, MI (US); Shayne Suban, Warren, MI (US); Shyama Maria Jose, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 597 days.

(21) Appl. No.: 18/176,523

(22) Filed: Mar. 1, 2023

(65) Prior Publication Data
US 2024/0294093 A1  Sep. 5, 2024

(51) Int. Cl.
| | | |
|---|---|---|
| *H01M 10/44* | (2006.01) | |
| *B60L 1/02* | (2006.01) | |
| *B60L 3/00* | (2019.01) | |
| *B60L 58/13* | (2019.01) | |
| *B60L 58/18* | (2019.01) | |
| *H01M 10/46* | (2006.01) | |

(52) U.S. Cl.
CPC ............... *B60L 58/13* (2019.02); *B60L 1/02* (2013.01); *B60L 3/0046* (2013.01); *B60L 58/18* (2019.02)

(58) Field of Classification Search
CPC ........ H02J 7/0042; B60L 58/13; B60L 58/18; B60L 58/20; B60L 58/10; B60L 58/12
USPC ........ 320/103, 104, 107, 114, 132, 135, 136
See application file for complete search history.

(56) References Cited

U.S. PATENT DOCUMENTS

| | | | |
|---|---|---|---|
| 2006/0152189 A1* | 7/2006 | Ambrosio | B60L 58/12 320/104 |
| 2019/0366830 A1* | 12/2019 | Cafeo | H02J 7/0013 |
| 2023/0163626 A1* | 5/2023 | Chen | H02J 7/00712 307/66 |

FOREIGN PATENT DOCUMENTS

CN      120792612 A   * 10/2025

* cited by examiner

*Primary Examiner* — Edward Tso
(74) *Attorney, Agent, or Firm* — Quinn IP Law

(57) ABSTRACT

A device for discharging a high-voltage ("HV") battery pack in an electrical system having a low-voltage ("LV") bus and a high-voltage ("HV") bus includes a resistive load and an electronic control unit ("ECU"). The ECU transmits electronic control signals to the resistive load to change an output state of the resistive load. As part of a related method, the ECU receives a state of charge ("SOC") of the battery pack and an auxiliary voltage level of the LV bus. The ECU then selectively adjusts the electronic control signals in response to the SOC and auxiliary voltage level to optimize the output state of the resistive load. This continues until the SOC is within a specified SOC range.

20 Claims, 4 Drawing Sheets

LOW-VOLTAGE DISCHARGE OF HIGH-VOLTAGE BATTERY PACK

INTRODUCTION

Electrified powertrain systems of motor vehicles and other mobile electrical systems include an electrical system configured to energize one or more electric motors to generate motive torque. For example, an electric traction motor may be connected to road wheels of an electric vehicle, with generated output torque being directed to the road wheels to propel the electric vehicle on a road surface. To this end, a high-voltage bus of the electric vehicle is connected to a rechargeable energy storage system ("RESS"), a principal component of which is a propulsion battery pack having an application-suitable number and configuration of electrochemical battery cells. The battery pack-to-motor connection is made through an intervening power inverter module when the electric traction motor is configured as polyphase/alternating current ("AC") machine.

High-voltage mobile and stationary electrical powertrain systems often include a separate low-voltage bus for powering a myriad of auxiliary devices. As used herein, the terms "low-voltage" and "auxiliary voltage" encompass voltage levels of about 12-15 volts (V) or less. Exemplary auxiliary devices include internal and external lights, radios, display screens, and instrument panel gauges. Such devices are powered by the low-voltage bus, with a direct current-to-direct current ("DC-DC") voltage converter connected between the high-voltage and low-voltage buses. Because the voltage capability of the high-voltage bus greatly exceeds the nominal 12V auxiliary voltage level, it is necessary to isolate the high-voltage side of the electrical system from the low-voltage side. Additionally, it is necessary to discharge the propulsion battery pack to below a threshold voltage level under certain conditions.

SUMMARY

Disclosed herein are automated systems and related methods for discharging a high-voltage ("HV") battery pack in an electrical system having a high-voltage ("HV") bus and a low-voltage ("LV") bus, the latter including an LV auxiliary battery, e.g., a typical 12 volt ("12V") lead acid battery. A non-limiting exemplary embodiment of the electrical system includes an electric vehicle, e.g., an electrified motor vehicle having road wheels and one or more electric traction motors energized by the battery pack. At times it is advantageous or necessary to discharge such a propulsion battery pack, for instance in a manufacturing or maintenance facility while the electric vehicle awaits shipment to another facility, workstation, dealership, or final end user. Best practices require a threshold low state of charge ("SOC") of the propulsion battery pack before shipping is permitted. In such a use scenario, however, existing strategies for discharging the propulsion battery pack tend to be slow, manually intensive, and imprecise. The present systems and methods are thus intended to improve upon the current state of the art in at least this respect.

In a possible embodiment, a device for discharging the HV battery pack using nominal 12V auxiliary power from the LV bus includes a resistive load and an electronic control unit ("ECU") in communication therewith. The ECU is programmed to selectively transmit electronic control signals to the resistive load. To this end, the ECU receives a reported SOC of the battery pack and a reported auxiliary voltage level ("battery voltage"). The ECU is also configured to selectively adjust the electronic control signals in response to the reported SOC and battery voltage to control an output state of the resistive load. The ECU discontinues the electronic control signals to the resistive load when the reported SOC is within a specified SOC range, e.g., under a calibrated SOC limit of about 30% in a possible implementation.

The resistive load may include one or more fan-and-heater elements, with each of the fan-and-heater elements being operable for intaking and heating ambient airflow from a surrounding ambient environment. The fan-and-heater elements thereafter discharge a resulting heated airflow back to the ambient environment.

The resistive load in a possible implementation may include one or more electrical components of the HV electrical system. For instance, the HV electrical system may be part of an electric vehicle or another electrified powertrain system having an electric traction motor powered by the battery pack to propel the electric vehicle. The ECU in this exemplary configuration may include an onboard controller of the electric vehicle.

When the electrical system is part of the above-noted electric vehicle, the resistive load could optionally include one or more HV loads and/or one or more LV loads of the electric vehicle. The electronic control signals in such a configuration may include control area network ("CAN") bus signals. Alternatively, the electronic control signals may include pulse width modulation ("PWM") signals inclusive of a PWM duty cycle and a PWM switching frequency.

The device in one or more embodiments may include a portable housing containing the resistive load. The ECU in such a portable configuration could be connected to an outer surface of the portable housing.

Another aspect of the present disclosure includes an ECU configured for selectively discharging an HV battery pack in an electrical system having an LV bus and an HV bus. The ECU in a possible configuration includes a processor and a computer-readable storage medium on which is recorded an instruction set. The instruction set is executable by the processor, with this action in turn causing the processor to receive a reported SOC of the battery pack and a reported battery voltage of an auxiliary battery connected to the LV bus. The ECU in this particular embodiment selectively adjusts electronic control signals to a resistive load in response to the reported SOC and the reported battery voltage to control an output state of the resistive load. The ECU discontinues transmission of the electronic control signals to the resistive load when the reported SOC is within a specified SOC range.

A method is also disclosed herein for discharging the HV battery pack in the above-summarized electrical system. An embodiment of the method includes receiving a reported SOC of the HV battery pack via a processor of an ECU as a first data stream, and receiving a reported battery voltage of an auxiliary battery as a second data stream. The method also includes selectively adjusting electronic control signals to a resistive load in response to the reported SOC and battery voltage to thereby control an output state of the resistive load. The electronic control signals are discontinued as part of the method when the reported SOC is within a specified SOC range.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
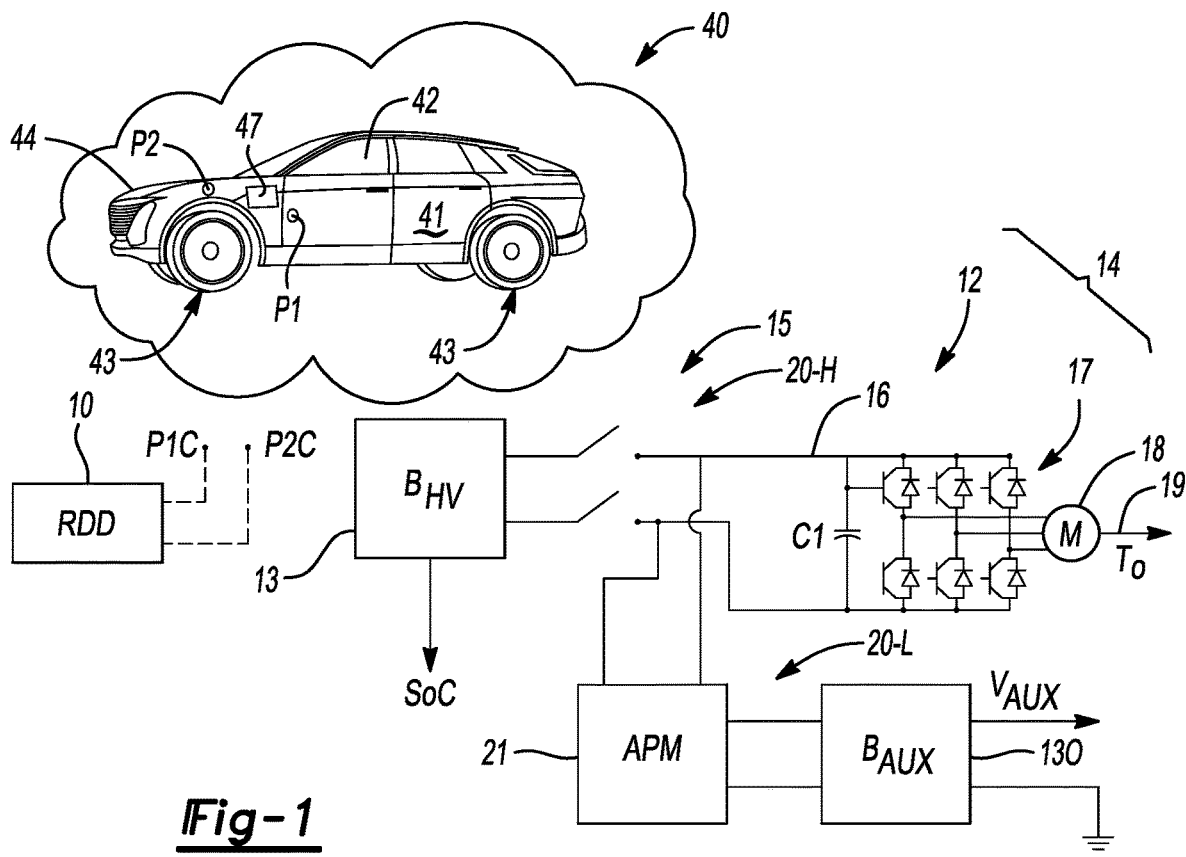
FIG. 1 illustrates a system configured to discharge a high-voltage ("HV") battery pack in accordance with an aspect of the present disclosure.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Figure 1A:
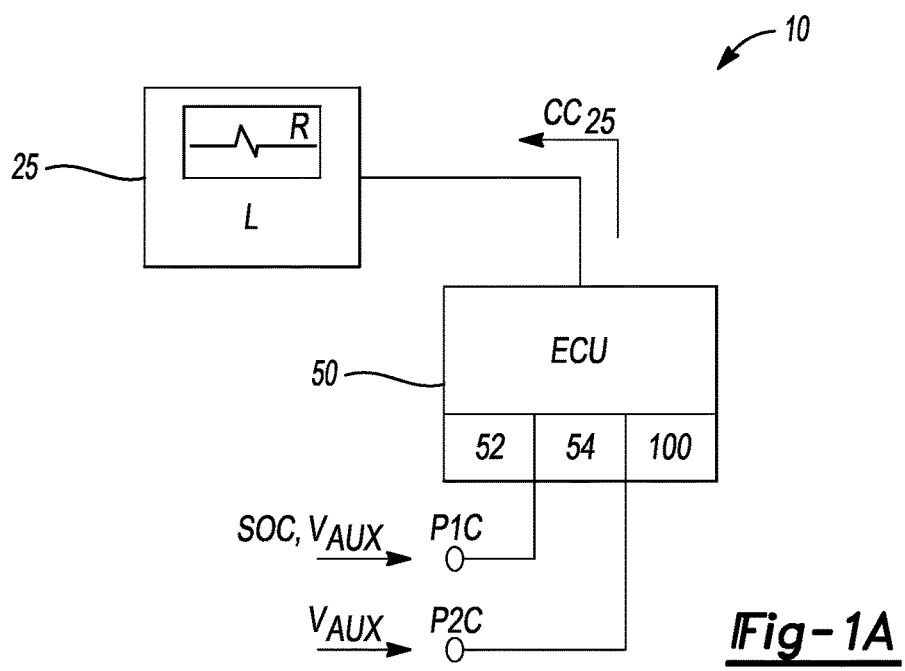
FIG. 1A is a schematic illustration of an embodiment of the system shown in FIG. 1.

Referring to the drawings, wherein like reference numerals correspond to like or similar components throughout the several Figures, FIGS. 1 and 1A illustrate a rechargeable energy storage system discharge device ("RDD") 10 constructed in accordance with the present disclosure. For illustrative consistency, representative embodiments of the RDD 10 as described below include a standalone portable unit that is selectively connectable to an electrical system 12 as shown in FIG. 1, e.g., an electrified powertrain system of a motor vehicle 40 having a vehicle body 41 defining a vehicle interior 42. The motor vehicle 40 of FIG. 1 may also include a front trunk ("frunk") 44 or another compartment providing user access to an auxiliary voltage connection P2.

Features and functions of the RDD 10 of FIGS. 1 and 1A in other embodiments may be partially or fully integrated into the structure of the electrical system 12. Moreover, the present teachings are applicable to a wide range of mobile and stationary variations of the electrical system 12, including but not limited to electrified powertrain systems of aircraft, marine vessels, railed vehicles, farm equipment, transport equipment, and other land, sea, or airborne mobile platforms, as well as powerplants, hoists, conveyor systems, and the like. The descriptions herein of the particular vehicular use scenario shown in FIG. 1 is therefore non-limiting and illustrative of just one possible implementation.

The RDD 10 as contemplated herein functions as an automated high-voltage ("HV") discharger circuit operable for reducing a state of charge ("SOC") of an HV battery pack ("$B_{HV}$") 13 of the electrical system 12. The RDD 10 does this in an optimized manner using closed-loop diagnostics link messaging control and auxiliary voltage feedback control as set forth in detail below.

A feature of the present strategy is the use of a low/auxiliary voltage side of the electrical system 12 for discharging the battery pack 13. In an exemplary scenario, for instance, an operator in a garage, manufacturing plant, warehouse, or remote location could selectively initiate an HV discharge event via the RDD 10 in accordance with the present teachings. When the RDD 10 is partially or fully integrated with the electrical system 12, the HV discharge event could commence in response to an operator command, e.g., through a graphical user interface (not shown) located inside of or external to the motor vehicle 40.

As appreciated in the art, assembly plants, such as for the exemplary motor vehicle 40 of FIG. 1, are ordinarily not permitted to ship the motor vehicle 40 when its battery pack 13 exceeds a calibrated upper SOC limit, typically about 30%. At times and for various reasons, however, some motor vehicles 40 could exceed this upper SOC limit. Operators under such conditions typically resort to leaving the motor vehicle 40 in an on state and turning on as many vehicle accessories as possible to quickly lower the SOC of the battery pack 13. In addition to relative slowness and a general lack of control precision of manual discharge processes, such processes also require the operator to attend to the motor vehicle 40 while continuously monitoring the SOC in an effort toward preventing overshoot/excessive discharge. Close monitoring is also required to prevent the motor vehicle 40 from entering into a time-triggered "sleep mode" in which the motor vehicle 40 automatically shuts itself off to conserve battery charge. These and other potential problems are addressed herein by the RDD 10 and an associated LV-based discharge methodology, with representative hardware and software implementations described in further detail below with reference to FIGS. 2-4.

Further with respect to the representative electrical system 12 of FIG. 1, the electrical system 12 is characterized by its separate high-voltage and low-voltage buses, which are respectively labeled "20-H" and "20-L". For embodiments in which the electrical system 12 is part of the motor vehicle 40, e.g., an electric vehicle constructed as a battery electric vehicle, a hybrid electric vehicle, or an extended-range electric vehicle, the term "high-voltage" may encompass battery voltage capabilities of about 300 volts (V) or more. Such voltage levels are suitable for generating motive torque for vehicular propulsion functions and for powering various high-voltage accessories aboard the motor vehicle 40. The term "low-voltage" for its part refers to auxiliary voltage levels, typically 12-15V. Low-voltage conductors (not shown) thus connect the LV bus 20-L to one or more low-voltage/12V accessories located aboard the motor vehicle 40, including but not limited to lights, radios, infotainment screens, sensors, etc.

In the exemplary embodiment of FIG. 1, the battery pack 13 is selectively connected to and disconnected from a load by a set of high-voltage contactors 15. The applied load in the illustrated configuration includes a DC link capacitor (C1), a power inverter module ("inverter") 16 having a plurality of semiconductor switches 17 connected to an electric traction motor ("M") 18. As appreciated in the art, inverters such as the inverter 16 shown in FIG. 1 utilize multiple dies of the semiconductor switches 17 as fast-responding ON/OFF switching devices, e.g., insulated gate bipolar transistors ("IGBTs"), metal oxide semiconductor field-effect transistors ("MOSFETs"), thyristors, etc. In a typical three-phase configuration of the electric traction motor 18, the semiconductor switches 17 are turned ON or OFF at predetermined switching intervals to output an alternating current ("AC") waveform to the electric traction motor 18.

The electric traction motor 18 shown in FIG. 1 is connected to a rotatable output member 19, such as a motor shaft and connected gears (not shown). During drive modes, the inverter 16 is controlled with pulse width modulation ("PWM") or another application-suitable switching control technique to energize phase windings of the electric traction motor 18. As depicted, the electric traction motor 18 is a polyphase AC motor, in this instance exemplified as a three-phase machine. Rotation of the output member 19 ultimately transfers torque (To) to a coupled load, including one or more road wheels 43 of the motor vehicle 40. During discharge/propulsion modes, electrical energy stored in constituent electrochemical battery cells (not shown) of the high-voltage battery pack 13 is used to power rotation of one or more of the road wheels 43. Other embodiments of the motor vehicle 40 may use more or fewer road wheels 43. Additionally, some of the road wheels 43 could be undriven/freewheeling, e.g., in rear-wheel drive or front-wheel drive configurations, or the road wheels 43 may be driven/powered, e.g., in an all-wheel drive or four-wheel drive configuration, without limitation.

The electrical system 12 of FIG. 1 may also include additional components for powering various systems or functions aboard the motor vehicle 40. For example, the battery pack 13 as depicted is connected to an accessory power module ("APM") 21 in the form of a DC-DC converter. As such, the APM 21 is operable for reducing a level of a DC voltage of the HV bus 20-H, e.g., 300V or more as noted above, to a typical 12-15V auxiliary voltage level. An auxiliary battery ("$B_{AUX}$") 130 such as a 12V lead-acid auxiliary battery may be electrically connected to the APM 21, with internal switching operation of the APM 21 ensuring that the auxiliary battery 130 remains charged, i.e., that the auxiliary battery voltage ($V_{AUX}$) equals about 12-15V.

The RDD 10 of FIGS. 1 and 1A is selectively connectable to the electrical system 12 of FIG. 1 via the connectors P1C and P2C. When used in conjunction with the exemplary motor vehicle 40 of FIG. 1, for instance, the LV connector P2C could connect to the auxiliary voltage connection P2. The diagnostics connector P1C for its part is configured as a data connector, and thus connects to an onboard diagnostics port P1 of the motor vehicle 40. The onboard diagnostics port P1, e.g., an Assembly Line Diagnostics Link ("ALDL") port or a similar manufacturer-specific or off-the-shelf configuration, could be located anywhere on the motor vehicle 40, but is typically accessible from within the vehicle interior 42 as appreciated in the art. Via the port P1 and connection P2, therefore, the RDD 10 is connected to LV power and in communication with a controller area network ("CAN") bus (not shown) aboard the motor vehicle 40. Once connected in this manner, therefore, the RDD 10 is ready to perform its programmed HV discharge functions to gradually reduce the SOC of the battery pack 13 in accordance with the disclosure.

Figure 4:
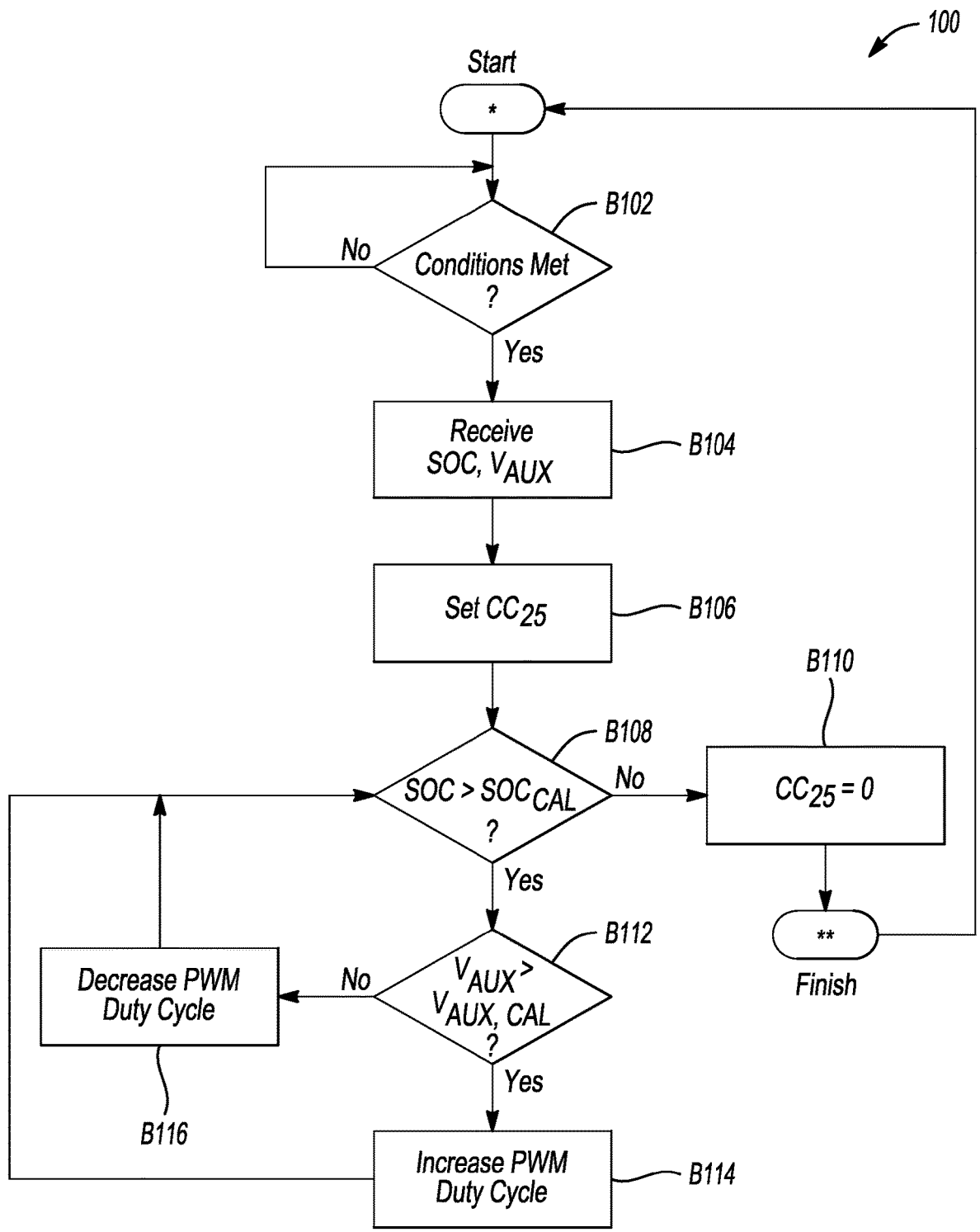
FIG. 4 is a flow chart describing a method for discharging the HV battery pack of FIG. 1 from the LV side of the system shown in FIG. 1.

As best shown in FIG. 1A, the RDD 10 as contemplated herein is a computerized device that is programmed to discharge the battery pack 13 in accordance with a method 100, an embodiment of which is shown in FIG. 4 and described in detail below. To that end, the RDD 10 includes an electronic control unit ("ECU") 50 equipped with one or more processors 52 and a computer-readable storage medium, i.e., memory 54. Instructions embodying the method 100 may be stored in the memory 54, with the memory 54 including tangible, non-transitory memory chips or circuits, e.g., magnetic or optical media, CD-ROM, solid-state/semiconductor memory (e.g., various types of RAM or ROM), etc. The ECU 50 is in communication with an onboard controller ("C") 47 of the motor vehicle 40 or integrated therewith in different embodiments.

The processor 52 in turn may be constructed from various combinations of Application Specific Integrated Circuit(s) (ASICs), Field-Programmable Gate Arrays (FPGAs), electronic circuits, central processing units, e.g., microprocessors, and the like. Non-transitory components of the memory 54 are capable of storing machine-readable instructions in the form of one or more software or firmware programs or routines, combinational logic circuit(s), input/output circuit(s) and devices, signal conditioning and buffer circuitry and other components that can be accessed by one or more processors 52 to provide a described high-voltage discharge functionality.

Input/output circuits and devices for use with the ECU 50 may include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables.

In general, the RDD 10 via its ECU 50 receives input signals from the electrical system 12 of FIG. 1. This occurs through the above-described connectors P1C and P2C. Resident cell sensing circuitry (not shown) in the battery pack 13 located aboard the motor vehicle 40 would typically measure relevant values, determine the SOC, and report the SOC to a resident battery controller (not shown) for the purpose of managing discharging and charging operations of the battery pack 13. The reported SOC is thus made available to the RDD 10 as a first data stream, e.g., as regularly collected data samples that are collected and reported at a calibrated sample interval.

A reported value of the auxiliary battery voltage ($V_{AUX}$) is likewise provided to the ECU 50 of FIG. 1A via the onboard diagnostics port P1 and mating connector P1C (and also potentially measured as an analog value via the connection P2 via the connector P2C), and thus its value is available as a second data stream in the course of performing the present method 100. In the present context, therefore, "data stream" means the relevant data is measured and reported at regular intervals, e.g., every second or at another application suitable interval. Connection of the RDD 10 to the existing LV bus 20-L of the motor vehicle 40 of FIG. 1 via the auxiliary voltage connection P2 has the added benefit of eliminating the need for a resident power supply on the RDD 10, as nominal 12V power is made available to the RDD 10 via the connector P2C.

As part of the present discharge control strategy, the ECU 50 responds to the reported SOC and auxiliary battery voltage ($V_{AUX}$) by transmitting electronic control signals ($CC_{25}$) to a resistive load ("L") 25. In FIG. 1A, the resistive load 25 is indicated by a total resistance ("R"), with the total resistance representing the sum of multiple resistive elements within the electrical system 12, in an integral approach, or within a separate portable housing 23 in a portable approach. The latter embodiment will now be described in further detail with reference to FIGS. 2 and 3.

Figure 2:
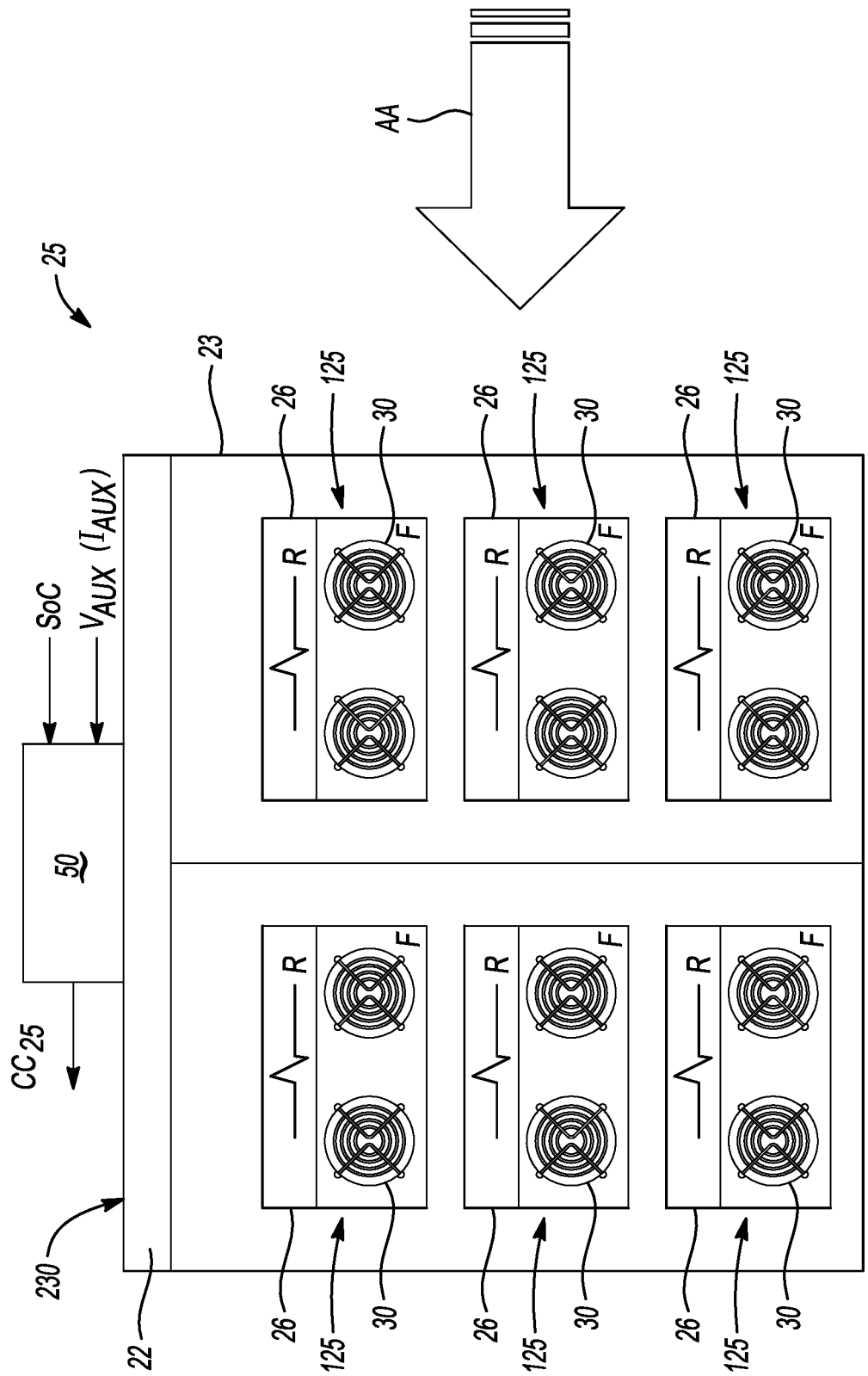
FIG. 2 illustrates a representative optional embodiment of a resistive load that is usable as part of the system of FIG. 1.

An embodiment of the RDD 10 as shown in FIG. 2 includes a standalone and portable version of the resistive load 25 in which the resistive load 25 includes a plurality of fan-and-heater elements 125. Each respective one of the fan-and-heater elements 125 is operable for intaking and heating an ambient airflow ("AA") from a surrounding ambient environment, and for thereafter discharging a resulting heated airflow ("HH" of FIG. 3) back to the surrounding ambient environment. To this end, the fan-and-heater elements 125 include two primary components in the form of a resistive heating element 26 and a fan 30, e.g., a multi-bladed circulating fan. An application-suitable number of the fan-and-heater elements 125 could be enclosed within the portable housing 23, e.g., four, six, eight, etc., with some or all of the fan-and-heater elements 125 activated by the ECU 50 as needed to help discharge the battery pack 13 of FIG. 1.

In the optional portable configuration shown in FIG. 2, the ECU 50 may be connected to an outer surface 230 of a top cover 22 or other external structure of the portable housing 23, with the top cover 22 and its outer surface 230 being located adjacent to the resistive load 25. This placement would facilitate movement of the RDD 10 between different electrical systems 12, thus implementing the RDD 10 as a mobile piece of plant equipment. The electronic control signals ($CC_{25}$) in this instance could include pulse width modulation ("PWM") signals inclusive of a PWM duty cycle, a PWM switching frequency, or both as needed.

Alternatively, programmed functions of the ECU 50 could be performed by the onboard vehicle controller 47 of FIG. 1 while still enabling use of the resistive load 25 in its depicted portable configuration. In still other embodiments as noted above, the resistive load 25 could take the form of/utilize one or more high-voltage or low-voltage electrical components of the electrical system 12, such as but not limited to seat and/or cabin heaters, compressors, auxiliary systems such as windshield wipers, lights, infotainment systems, etc. In such an embodiment, the onboard controller 47 could be programmed to perform the method 100, thereby forgoing the need for a separate portable unit of the type illustrated in FIG. 2. The electronic control signals ($CC_{25}$) transmitted to the resistive load 25 to control an output state of the resistive load 25, e.g., by changing a speed and/or temperature setting of the one or more fan-and-heating elements 125, in this case could include CAN bus signals from the onboard controller 47 or from the ECU 50.

Figure 3:
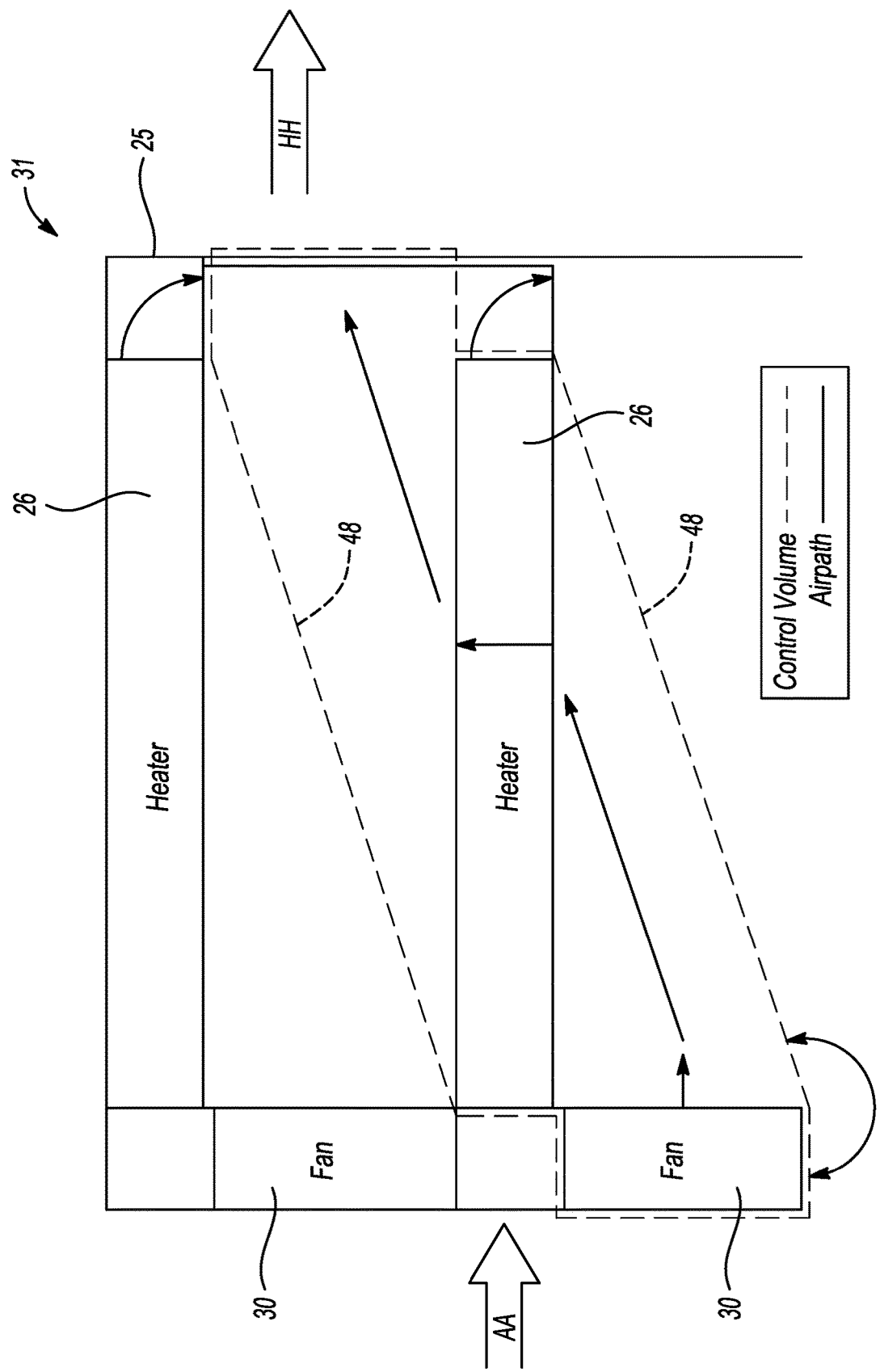
FIG. 3 is an illustration of airflow through fan-and-heater elements usable as part of the resistive load of FIG. 2.

As illustrated in FIG. 3 as an airflow diagram 31, representative airflow is shown in a simplified stacked pair of the fan-and-heater elements 125. Each fan-and-heater element 125 defines a control volume, as indicated by flow boundary lines 48. The resistive heating element 26 and a corresponding fan 30 are powered by the electronic control signals ($CC_{25}$) of FIG. 2, with the energized fan 30 drawing in the ambient airflow (AA). The ambient airflow (AA) in turn passes through or over the resistive heating element 26, which due to the electronic control signals ($CC_{25}$) is set to an optimized output state as determined by the ECU 50. As the ambient airflow (AA) passes over/around the energized resistive heating element 26, heat is extracted from the resistive heating element 26 and exhausted back into the surrounding ambient atmosphere as resulting heated airflow (HH).

Referring now to FIG. 4, the method 100 of the present disclosure is shown in simplified form as being organized into discrete logic blocks. Each logic block in turn represents a particular step, function, or subprocess that is to be performed via the ECU 50 when executing the present method 100. As noted above, the electrical system 12 of FIG. 1 is used in a non-limiting embodiment as part of the motor vehicle 40, which in this instance is configured as an electric vehicle for which the electrical system 12 is configured as part of an electrified powertrain system.

The ECU 50 of FIG. 1A will initiate ("*") upon connection of the connectors P1C and P2C of the RDD 10 to the corresponding port P1 and connection P2 of the motor vehicle 40. The ECU 50 also establishes electronic communication with the onboard controller 47 located aboard the motor vehicle 40 of FIG. 1. The method 100 proceeds to block B102 when these actions have been completed.

At block B102 ("Conditions Met?"), the ECU 50 determines whether various conditions have been satisfied before continuing with performance of the method 100. For instance, conditions for performing the method 100 could include the motor vehicle 40 being turned on/operating in an ON state, and that a timed auto-shutdown function of the motor vehicle 40 has been disabled. If such conditions are not satisfied, the ECU 50 may command the onboard controller 47 of FIG. 1 remotely or via the onboard diagnostics port P1 to turn on the motor vehicle 40 and disable its auto-shutdown function, with the latter action ensuring that the motor vehicle 40 will be powered on long enough for the method 100 to finish in its entirety.

Thus, the method 100 may include detecting a connection of the ECU 50 to the LV bus 20-L of FIG. 1 and to the onboard diagnostics port P1 of the motor vehicle 40 as a first condition, and detecting a closed contactor state of the HV bus 20-H as a second condition. The closed contactor state in such an approach is indicative of a connection of the HV battery pack 13 to the HV bus 20-H via a closed state of the HV contactors 15 shown in FIG. 1. Additionally, the ECU 50 may transmit an auto-shutdown override signal as a third condition, e.g., as part of the electronic control signals ($CC_{25}$) or a separate signal. The auto-shutdown override signal as noted above is configured to prevent a timed shutdown of the motor vehicle 40. The method 100 then proceeds to block B104.

At block B104 ("Receive SOC, $V_{AUX}$"), the ECU 50 receives the reported state of charge ("SOC") of the battery pack 13 and the reported LV/auxiliary battery voltage ("$V_{AUX}$"), with both signals being communicated via port P1 as CAN bus signals in the automotive embodiment of FIG. 1 as appreciated in the art. As part of block B104, the ECU 50 of FIG. 1A may also verify that a measured battery current value from the auxiliary battery 130, which is measured and reported by a corresponding current sensor (not shown) on the low-voltage bus 20-L of FIG. 1, is within a calibrated range/below a current threshold, and that electrical power drawn from the low-voltage bus 20-L remains below a maximum power limit. The method 100 automatically terminates when these additional limits are not satisfied, with the method 100 otherwise proceeding to block B106.

Block B106 ("Set $CC_{25}$") entails setting initial parameters for the electronic control signals ($CC_{25}$) to the resistive load 25 of FIGS. 1-3 in logic of the ECU 50. Initial parameters in the course of performing the method 100 may include the PWM duty cycle, a target SOC of the battery pack 13, a PWM duty cycle step, a wait time between PWM step transitions, a lower voltage limit for the low-voltage bus 20-L/auxiliary battery 130 of FIG. 1, and a PWM frequency. At the start of the method 100, the ECU 50 will set the initial PWM output to zero, such that the resistive load 25 is not turned on. An exemplary target SOC for an automotive application includes less than 30%, with a lower voltage limit of about 12.8V. The method 100 proceeds to block B108 after the ECU 50 has set the initial parameters for the electronic control signals ($CC_{25}$).

Block B108 ("SOC>$SOC_{CAL}$?") includes comparing the reported SOC of the battery pack 13 to the calibrated or predetermined SOC limit set in prior block B106. The method 100 proceeds to block B110 when the reported SOC from the onboard controller 47 of FIG. 1 is less than or equal to such an SOC limit, and to block B112 in the alternative when the reported SOC of the battery pack 13 exceeds the calibrated SOC limit.

At block B110 ("$CC_{25}$=0"), the ECU 50 discontinues the electronic control signals ($CC_{25}$) to the resistive load 25. Having successfully discharged the battery pack 13, the ECU 50 may then enter a "standby" or "ready" mode for use on another electrical system 12. The method 100 is then finished (**) for the present HV discharge event.

At block B112, ("$V_{AUX}$>$V_{AUX, CAL}$?") the ECU 50 next determines if the reported auxiliary battery voltage ($V_{AUX}$) of the auxiliary battery 120 shown in FIG. 1 exceeds a calibrated voltage limit, e.g., the 12.8V example noted above in block B106. The method 100 proceeds to block B114 when the auxiliary voltage ($V_{AUX}$) remains higher than the calibrated voltage limit, with the method 100 proceeding to block B116 in the alternative when the auxiliary battery voltage ($V_{AUX}$) is less than the calibrated voltage limit.

Without departing from the intended scope of the disclosure, the use of the auxiliary battery voltage ($V_{AUX}$) may be replaced by a reported battery current in alternative embodiments to the same end effect, albeit with a different sign. That is, when the auxiliary battery 130 is providing power, its output current will increase rather than decrease, and thus a calibrated current limit would be an upper limit rather than the lower limit used in the voltage-based threshold comparison.

Block B114 ("Increase PWM Duty Cycle") includes increasing the PWM duty cycle command from block B106 to optimize the discharge rate of the battery pack 13. Arrival at block B114 within the scope of the method 100 is indicative of the APM 21 of FIG. 1 being functionally able to provide more power to the LV bus 20-L, in this case for the express purpose of discharging the battery pack 13 via the resistive load 25. This action could entail transmitting an adjusted PWM signal directly from the ECU 50 to the resistive load 25 in one or more embodiments, or perhaps requesting this action from the onboard controller 47 of FIG. 1 through the connection to port P1, with the onboard controller 47 thereafter requesting this PWM change. The method 100 then proceeds to block B116.

Block B116 ("Decrease PWM Duty Cycle") includes decreasing the PWM duty cycle parameter from block B106. Arrival at block B116 would mean that the APM 21 of FIG. 1 has reached its maximum power limit, and thus is not able to provide additional power for discharging the battery pack 13 via the resistive load 25. This block B116 control action, as is the case in block B114, could entail transmitting an adjusted PWM signal from the ECU 50 to the resistive load 25 at a reduced level, or requesting this control action from the onboard controller 47. The method 100 then proceeds to block B108 for verification of the SOC of the battery pack 13.

As will be appreciated by those skilled in the art in view of the foregoing disclosure, the present method 100 and RDD 10 described herein enable optimal discharge of the battery pack 13 of FIG. 1 from the LV-bus 20-L considering power limits of the APM 21. The RDD 10 is powered by the electrical system 12, e.g., the motor vehicle 40, thereby facilitating optional portability as well as the ability to apply the present teachings in remote locations, garages, or manufacturing facilities. Using the diagnostics link provided via port P1, and based on the SOC of the battery pack 13 and the auxiliary battery voltage level ($V_{AUX}$), the RDD 10 selectively adjusts the PWM control signals to the resistive load 25. This action in turn increases the effective resistance of the resistive load 25 until the output voltage of the auxiliary battery 130 drops into a specified range, e.g., below 12.8V or another suitable threshold. The RDD 10 maintains discharge control at an optimal rate while continuously monitoring the SOC and auxiliary battery voltage ($V_{AUX}$) to accommodate for ON/OFF cycling of internal loads of the motor vehicle 40 that may be required for other purposes.

Within the representative circuit topology of the electrical system 12 depicted in FIG. 1, the APM 21 is limited to a calibrated maximum power output. This value varies with the particular configuration of the motor vehicle 40. Once the maximum power output of the APM 21 is exceeded, the output voltage from the auxiliary battery 130 of FIG. 1 will begin providing low-voltage power to the LV bus 20-L. Within this context, the RDD 10 disclosed above will function as intended in a wide variety of electrical systems 12 and motor vehicles 40 with different APMs 21 and associated maximum power limits. Similarly, the RDD 10 of the present disclosure will accommodate different internal loads by discharging at the optimal rate as noted above, a beneficial result of the above-described closed-loop control strategy. These and other potential benefits will be readily appreciated by those skilled in the art in view of the foregoing teachings.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A device for discharging a high-voltage ("HV") battery pack in an electrical system having a high-voltage ("HV") bus and an auxiliary battery, the device comprising:
   a resistive load having an output state; and
   an electronic control unit ("ECU") in communication with the resistive load, the ECU being programmed to transmit electronic control signals to the resistive load to thereby change the output state, wherein the ECU is configured to:
   receive a reported state of charge ("SOC") of the HV battery pack;
   receive a reported battery voltage of the auxiliary battery; and
   selectively adjust the electronic control signals in response to the SOC and the reported battery voltage to control the output state of the resistive load until the SOC is within a specified SOC range.

2. The device of claim 1, wherein the resistive load includes one or more fan-and-heater elements each operable for intaking and heating an ambient airflow from a surrounding ambient environment, and for thereafter discharging a heated airflow to the surrounding ambient environment.

3. The device of claim 1, wherein the resistive load includes one or more electrical components of the electrical system.

4. The device of claim 3, wherein the electrical system is part of an electric vehicle having an electric traction motor powered by the HV battery pack to propel the electric vehicle, and wherein the ECU is configured as at least part of an onboard controller of the electric vehicle.

5. The device of claim 4, wherein the resistive load includes one or more HV loads of the electric vehicle and one or more LV loads of the electric vehicle, and wherein the electronic control signals include control area network ("CAN") signals.

6. The device of claim 1, wherein the electronic control signals include pulse width modulation ("PWM") signals inclusive of a PWM duty cycle and a PWM switching frequency.

7. The device of claim 1, further comprising:
a portable housing positioned external to the electrical system and containing the resistive load.

8. The device of claim 7, wherein the portable housing includes a top cover having an outer surface, and wherein the ECU is connected to the outer surface.

9. An electronic control unit ("ECU") for discharging a high-voltage ("HV") battery pack in an electrical system having a high-voltage ("HV") bus and an auxiliary battery, the ECU comprising:
a processor; and
a computer-readable storage medium on which is recorded an instruction set, the instruction set being executable by the processor to thereby cause the processor to:
receive a reported state of charge ("SOC") of the HV battery pack;
receive a reported battery voltage of the auxiliary battery;
selectively adjust electronic control signals to a resistive load in response to the reported SOC and the reported battery voltage to thereby control an output state of the resistive load; and
discontinue the electronic control signals to the resistive load when the SOC is within a specified SOC range.

10. The ECU of claim 9, wherein the resistive load includes one or more fan-and-heating elements, and wherein the instruction set is executable by the processor to thereby cause the processor to command a change in a speed and/or temperature setting of the one or more fan-and-heating elements, wherein the output state includes the speed and/or temperature setting.

11. The ECU of claim 9, wherein the electrical system is part of an electric vehicle, the ECU is configured as an onboard controller of the electric vehicle, and the instruction set is executable by the processor to cause the processor to receive the reported SOC and the reported battery voltage as controller area network ("CAN") signals aboard the electric vehicle.

12. The ECU of claim 11, wherein the resistive load includes one or more HV loads and one or more LV loads aboard the electric vehicle, and wherein the instruction set is executable by the processor to cause the processor to control the output state of at least one of HV loads or the LV loads.

13. The ECU of claim 11, wherein the instruction set is executable by the processor to cause the processor to:
detect a connection of the ECU to the auxiliary battery and to an onboard diagnostics port of the electric vehicle as a first condition;
detect a closed contactor state of the HV bus as a second condition, the closed contactor state being indicative of a connection of the HV battery pack to the HV bus; and
transmit an auto-shutdown override signal as a third condition, the auto-shutdown override signal being configured to prevent a timed shutdown of the electric vehicle.

14. The ECU of claim 9, wherein the electronic control signals are pulse-width modulation ("PWM") signals to the resistive load, and wherein the instruction set is executable by the processor to cause the processor to selectively adjust the electronic control signals by modifying a PWM duty cycle and/or a PWM switching frequency.

15. The ECU of claim 14, wherein the ECU is configured to connect to a surface of a portable housing, and wherein the portable housing is external to the electrical system.

16. A method for discharging a high-voltage ("HV") battery pack of an electrical system having a high-voltage ("HV") bus and a low-voltage ("LV") bus, the LV bus including an auxiliary battery, the method comprising:
receiving a reported state of charge ("SOC") of the HV battery pack via a processor of an electronic control unit ("ECU") as a first data stream;
receiving, via the processor, a reported battery voltage of the auxiliary battery as a second data stream;
selectively adjusting electronic control signals to a resistive load in response to the reported SOC and the reported battery voltage to thereby control an output state of the resistive load; and
discontinuing the electronic control signals when the reported SOC is within a specified SOC range.

17. The method of claim 16, the resistive load including one or more fan-and-heating elements, wherein selectively adjusting the electronic control signals includes commanding a change in a speed and/or temperature setting of the one or more fan-and-heating elements as the output state.

18. The method of claim 16, wherein the electrical system is part of an electric vehicle and the ECU is configured as an onboard controller of the electric vehicle, and wherein receiving the reported SOC and receiving the battery voltage of the auxiliary battery includes receiving the reported SOC and the reported battery voltage from a vehicle controller as controller area network ("CAN") signals.

19. The method of claim 18, wherein the resistive load includes an HV load of the electric vehicle and an LV load of the electric vehicle, and wherein selectively adjusting the electronic control signals includes changing a commanded output state of at least one of the HV load or the LV load via the CAN signals.

20. The method of claim 19, further comprising:
detecting, via the CAN signals, a connection of the ECU to the LV bus and a diagnostics port of the electric vehicle as a first condition;
detecting, via the CAN signals, a closed contactor state of the HV bus as a second condition, the closed contactor state being indicative of a connection of the HV battery pack to the HV bus; and
transmitting an auto-shutdown override signal via the ECU as a third condition, the auto-shutdown override signal being configured to prevent a timed shutdown of the electric vehicle.

\* \* \* \* \*